INVENTOR.
HERBERT M. TEAGER
BY
[signature]
ATTORNEY

INVENTOR.
HERBERT M. TEAGER
BY
Martin M. Santa
ATTORNEY

INVENTOR.
HERBERT M. TEAGER
BY Martin M. Santa
ATTORNEY

INVENTOR.
HERBERT M. TEAGER
BY
Martin M. Santa
ATTORNEY

INVENTOR.
HERBERT M. TEAGER
BY Martin M. Santa
ATTORNEY

United States Patent Office 3,440,643

Patented Apr. 22, 1969

3,440,643

ANALOG TO DIGITAL CONVERTER

Herbert M. Teager, Belmont, Mass., assignor to Massachusetts Institute of Technology, Cambridge, Mass., a corporation of Massachusetts Filed Dec. 19, 1963, Ser. No. 331,687
Int. Cl. H03k *13/243;* H04l *3/00*
U.S. Cl. 340—347 16 Claims This invention relates to a position determining device and more particularly to a device which provides a digital signal indicative of the analog position of a sensor on a surface.

The desirability of having a device which converts the analog position of a sensing device to digital information has long been recognized. One form of such a device exists in the form of a light pen-cathode ray tube-computer interconnection. Briefly, this device uses a digital computer controlled sweep on a cathode ray tube to provide a moving spot of light of known position. The $x$ and $y$ analog coordinate positions of a light pen responsive to the spot of light is provided by the computer in digital form at the instant a flash of light is detected by the light pen. This device has many deficiencies included among which are the requirement for a high speed computer for relatively low pen speed following capability, and accuracy limitations imposed by the cathode ray beam analog position on the face of the tube not corresponding exactly to the analog of the digital values in the computer.

Another form of analog to digital converter in only one coordinate is the shaft encoder device which converts angular position of a shaft to digital information. Available devices of the brush contact type or more recently of photocell output type have one common characteristic which is that there must be as many output sensors as there are digital characters; in other words, the output is a parallel output. There are applications where serial output is desirable because only one output sensor is then required. The present invention is capable of providing a type of shaft encoder having a serial output.

It is, therefore, an object of this invention to provide an analog to digital conversion device which is accurate with high resolution, simple, and inexpensive compared with devices which can perform a similar function.

It is a further object of this invention to provide an apparatus which will provide a means for determining the analog position of a sensor on a surface and present this position in the form of serial digital data.

With the foregoing and other objects in view, a feature of the apparatus is its capability of providing in economical fashion an N bit serial binary data sequence on a maximum of $2^N$ different information channels with only N binary sources. A further feature is that the digital rate capability of the device is not greater than that required by the desired resolution and sensor velocity with no increase because of scanning loss.

The basic principle upon which this form of analog to digital conversion rests, may be summarized as follows: First, each and every distinct position on a surface (up to the limit of resolution) is subject to a unique serial sequence of binary pulse information (positive-negative or pulse-no pulse). The signals may be in the form of short range electromagnetic fields, such as light rays, electric, or magnetic fields, and coded so that each unique analog position in a one or two coordinate system is represented by its own unique bit-serial, binary, grey or other coded pulse train. Digital position is determined by a single sensor, capable of detecting the field of the two binary states of the information pulses.

The information pulses are to be carried in a substantially parallel array of signal conductors (wires, lossy fibre optics, etc.). For two dimensional conversions, a second orthogonal array would carry its own serial signals in a joining time increments. For some applications, the array might be warped, and non-uniform. The short-range nature of the field can assure that the sensible signal field nearest any single conductor (or orthogonal pair of conductors) is dictated by the bit serial information pulse in that conductor. To give a specific example of serial bit generation in a plurality of wires, consider four parallel wires, the time sequence of bit pulse polarities in the wires might be ++; +−; −+; −−, respectively, corresponding to digital positions 00; 01; 10; and 11. The sequence would be generated by two bit drivers arranged to fire in serial fashion, and with the coupling to the four driven wires arranged to generate the +, +, −, −, pulse polarities in each wire concurrently by the first bit position driver; and +, −, +, −, by the second bit position driver.

Other features of the invention reside in certain details of construction and modes of operation that will become apparent from the following description of a preferred embodiment and certain alternatives thereto, having reference to the appended drawings illustrating the same.

Figure 1:
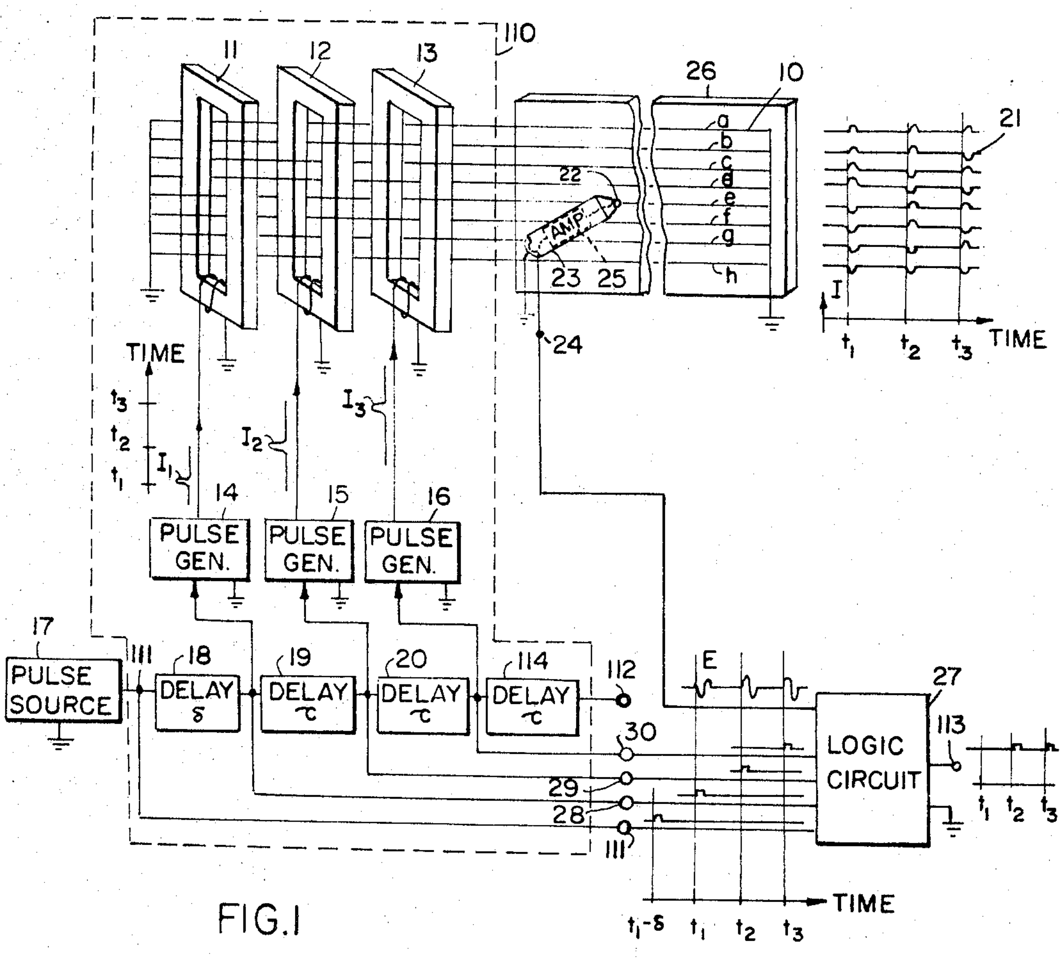
FIGURE 1 is a partially diagrammatic view illustrating a magnetic field embodiment of the invention.

An embodiment of the invention for determining the analog position of a sensor in digital form in one coordinate is illustrated in FIGURE 1. This particular embodiment uses magnetic field coupling as the particular electromagnetic field used for determination of sensor position. An array 10 of parallel electrical conductors *a–h* are energized by being coupled to transformers 11, 12, 13. Each conductor *a–h* of array 10 is wound through transformers 11, 12, 13 in a winding direction which is different from every other conductor through at least one transformer 11, 12, 13. One way of accomplishing this is shown in FIGURE 1 where the conductors *a–h* are split into two groups *a–d* and *e–h* before threading the groups through transformer 11 in opposite directions. Group *a–d* is further split into two groups *a–b* and *c–d* before threading groups through transformer 12 in opposite directions. Group *a–b* is split into individual conductors *a* and *b* before being threaded through transformer 13 in opposite directions. It is seen that the process detailed above can be applied to groups *e–h, e–f,* and *g–h* so that each conductor *a–h* threads all three transformers in a unique order.

The transformers 11, 12, 13 are energized by current pulses $I_1$, $I_2$, $I_3$ from pulse generators 14, 15, 16 at times $t_1$, $t_2$, $t_3$, respectively. Pulse generator 14 is triggered at time $t_1$ by a pulse delayed by unit 18 after originating in pulse source 17. Pulse generators 15, 16 are triggered at times $t_2$, $t_3$ by pulses from delay units 19, 20, respectively. One form of pulse generator which is satisfactory is the conventional blocking oscillator circuit. The sequence of current pulses $I_1$, $I_2$, $I_3$ energizing transformers 11, 12, 13 causes each conductor *a–h* to have a unique positive and negative current pulse sequence induced therein as shown by the waveforms 21 adjacent each conductor *a–h*. Each conductor, therefore, has a unique pulsed sequence of positive and negative magnetic fields immediately surrounding it, corresponding to its unique energization current pulse sequence. This field decreases in magnitude inversely with distance from the conductor.

A sensor coil 22 of several turns of small diameter wire supported by mount 23 is held either by hand or mechanically immediately adjacent to the array of conductors 10. The sense coil 22 being responsive to changes in magnetic flux will have induced in it a voltage pulse sequence corresponding to the current pulse sequence in the conductor to which it is nearest. For maximum induced voltage the plane of coil 22 should be parallel to the conductor direction. For the location of coil 22 shown in FIGURE 1 where it is adjacent conductor *e*, a voltage pulse sequence E at output terminal 24 is obtained. This particular output pulse sequence occurs only when coil 22 is adjacent conductor *e*. If the coil 22 is adjacent any other conductor of array 10, a different unique output pulse sequence corresponding to the unique excitation current pulse sequence in that conductor is obtained. It is noticed that the output pulse sequence E is a bipolar pulse sequence because of the pulsed nature of the magnetic field detected by coil 22. The bipolarity is not a difficulty since circuitry responsive only to a selected portion of the bipolar pulse may be attached to the output terminal 24. For example, known gating techniques such as in logic circuit 27 may be employed to select the leading half of the bipolar output pulses by using the trigger pulses at terminals 28, 29, 30 as gating pulses.

It is seen that this invention presents in digital form a unique pulse sequence in a sense coil indicating its position to be proximate a conductor at a known analog location having the same unique pulse sequence excitation.

The invention has been described as a device which has eight conductors in array 10 with three energizing transformers 11, 12, 13. Greater resolution requires a larger number of conductors. The number of conductors which can be accommodated by *n* transformers is $2^n$. Thus, a resolving power of one part in 1024 over the array 10 would require 1024 conductors energized by 10 transformers connected in the binary fashion following the illustration of FIGURE 1.

The conductor array 10 is capable of being constructed by various techniques to provide a wide range of resolving power and total analog positions (or linear dimension transverse to the conductors' length). The resolving power is ultimately limited by several factors included among which are the small signal obtained by the small sense coil 22 which must be used for a small diameter conductor. Closely wound insulated wire of 0.01 inch total diameter used in an array 10 is capable of being resolved with a sense coil 22 which has been wound around a permalloy core having an air gap comparable to the conductor diameter extending its long dimension in the conductor direction. Lower resolution requirement allows air core sense coils 22 to be used. The voltage induced in sense coil 22 is amplified by amplifier 25 to produce signals at output terminal 24. Printed wiring as well as ordinary wires may be deposited on a substrate 26 to form the array 10.

There is a relationship between the attainable resolution, the spacing of the wires, and the cross section and location of the sensor coil 22 about the plane of the array 10. The worst case for resolution occurs when adjacent wires are carrying currents in opposite directions. The magnetic field from each wire has a horizontal component directly above the wire which is the field component to which it is desired that the sensor 22 be responsive. This horizontal component direction is reversed on reversal of current direction in a wire. Therefore, adjacent conductors having opposed current directions will have horizontal components of magnetic fields which are opposed. The horizontal field at any point above the array 10 is obtained by superposition of the fields produced by all the wires of the array. Since the field from a conductor diminishes inversely with distance from the conductor, it is seen that sensing should occur as close to the plane of the array as possible if the field from a particular conductor of the array is to be sensed. It is also seen that increasing the spacing of the conductors reduces the influence of adjacent conductors. In practice, the worst case condition of adjacent conductors carrying oppositely directed currents is avoided by using grey coding of adjacent conductors together with appropriate logic circuitry. However, the above discussion still applies to the fields generated by conductors further removed from each other and not avoided by coding or logic circuitry.

The interfering field situation can be improved by placing the array 10 above a conducting plane (not shown in FIGURE 1). The image currents induced in the plane by the current in the conductors providing a more sharply defined magnetic field pattern that will better retain the direction of the horizontal field component of a conductor at a distance from the plane. However, the magnitude of the field decreases inversely with the square of the distance from the conductor as compared with the decrease with the first power of distance for the field without an image plane. Thus, much higher drive currents are needed to provide a useful field greater than noise if higher resolution is obtained by the ground plane technique.

Figure 2:
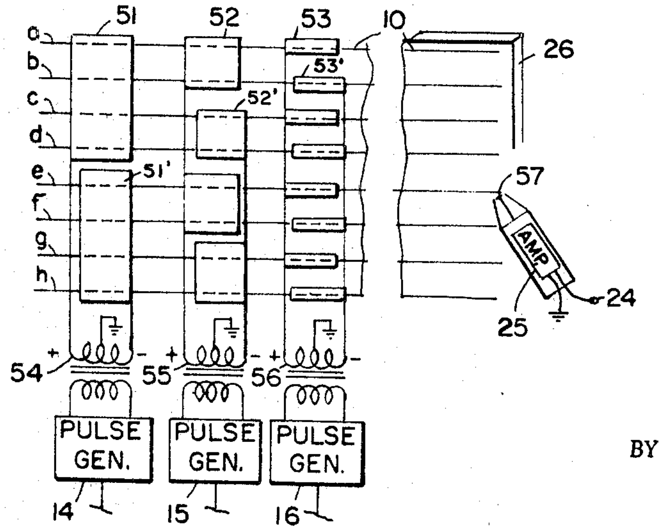
FIGURE 2 is a view showing an electric field driving circuitry for the apparatus of FIGURE 1.

Although the invention has been described in terms of a current driven array 10 with magnetic sensing by coil 22, it is apparent that another embodiment of the invention can provide a source of electromagnetic field by employing the electrical analog of FIGURE 1 by using voltage drive with electric field sensing. Referring to FIGURE 2, only that portion of FIGURE 1 which is different because of voltage drive is considered. The array conductors 10 on support 26 are caused to extend over metallic tabs 51, 52, and 53 corresponding to transformers 11, 12, and 13. The tabs 51, 51' are connected to the push-pull output of transformer 54. Pulse generator 14 is energized as explained in FIGURE 1 to cause transformer 54 to provide a positive and negative voltage at time $t_1$ on tabs 51, 51', respectively. These voltages are coupled to ungrounded array conductors *a–d* and *e–h*, respectively, through the capacitance which exists between conductors 10 and the closely spaced, insulated tabs 51, 51'. Tabs 52, 52', 53 and 53' are likewise connected to the push-pull secondaries of transformers 55, 56 to provide positive and negative voltages coupled to conductors 10 at times $t_2$ and $t_3$. The tabs 51, 52, 53 are conveniently constructed by printed wiring techniques by deposition of electrically conductive material on a non-conductive substrate. Since it is the voltage on conductors 10 which is to be sensed, the coil 22 of FIGURE 1 is replaced by a metallic sensor plate 57 of small cross section which when in proximity to one of conductors 10 will capacitively couple to the voltage pulse train on that conductor which on amplification in amplifier 25 is provided at output terminal 24. It is preferred that sensor plate 57 be electrically insulated from the conductors of array 10 to avoid the possibility of short circuiting adjacent conductors while being close enough to provide good capacitive coupling.

Figure 3:
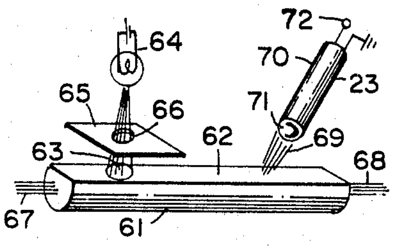
FIGURE 3 is a representation of a lossy fibre optic rod light transmission system.

FIGURE 3 shows another type of electromagnetic transmission conductor other than the electrical conductors of FIGURES 1 and 2. A visible light transmission medium such as, for example, a Lucite rod will propagate along its length light energy which has been introduced into it. In FIGURE 3, Lucite rod 61 has been caused to have a surface 62 relatively flat compared to the remainder of its circumference so that when energized by light source 64 it will emit light radiation from surface 62 along its length instead of merely at its ends. A mask 65 with hole 66 prevents any light rays 63 from source 64 other than those passing through hole 66 to impinge on surface 62. The light beam 63 impinging on surface 62 enters and travels down rod 61 and emerges as rays 67, 68 from both its ends, but most importantly for purposes of the invention escapes as rays 69 from the rod surface 62 along its entire length. A light sensitive detector 70 such as a photodiode or phototransistor preferably with a focussing lens 71 proximate to the surface 62 will respond to the escaping light rays 69 to provide a signal at output terminal 72.

Figure 4:
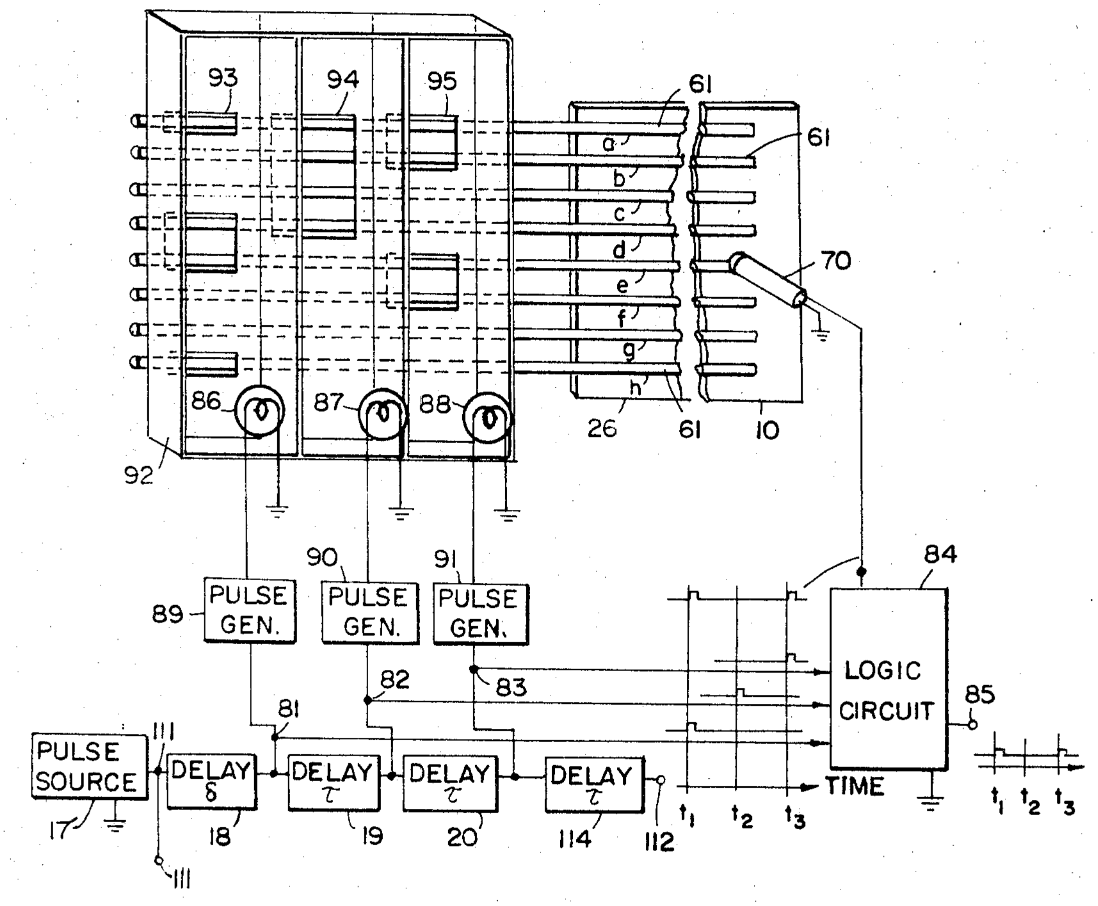
FIGURE 4 is a partially diagrammatic view illustrating an optical field embodiment of the invention.
Figure 6:
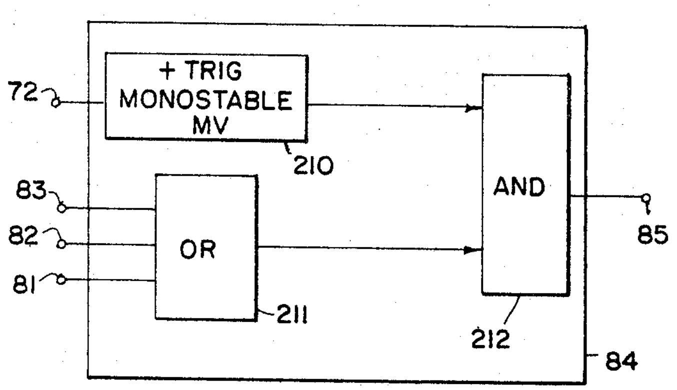
FIGURE 6 is a block diagram of the logic circuit used in FIGURE 4.

The lossy light rod embodiment of the invention is shown in FIGURE 4. An array 10 of light rods 61 is mounted on support or substrate 26 for mechanical rigidity. Each rod is caused to conduct a coded sequence of light pulses. These coded sequences differ from the current and voltage sequence of FIGURES 1 and 2 in that no polarity of light signal is used. Instead, what could normally correspond to a negative current or voltage is only available in FIGURE 4 as an absence of light. The output 72 of the light sensitive sensor or detector 70 is processed along with trigger pulses from terminals 81, 82, 83 in the logic circuit 84 to provide a sequence of voltage signals indicative of sensor 70 position. A light flash 69 from light rod 61 is caused to produce a positive voltage signal on output 72 of sensor 70 which are combined with positive trigger pulses at terminals 81, 82, 83 in logical circuitry 84 of the type shown in FIGURE 6 to provide a zero amplitude signal at output terminal 85 in the absence of a light flash and a positive signal in the event that there is a light flash. A positive signal at terminal 72 sufficient to cause multivibrator MV 210 of FIGURE 6 to trigger is gated in AND circuit 212 with the trigger pulses from terminals 81, 82, 83 which are combined in OR circuit 211. A trigger from terminal 111 of FIGURE 4 indicates the beginning of an output pulse train. A positive pulse signal at times $t_1$ and $t_3$ on sensor output 72 occurs when sensor 70 is adjacent to light rod **61*e* as shown in FIGURE 4. After processing in logical circuit 84 a positive, zero, positive voltage pulse sequence is obtained at output terminal 85 of logic circuit 84 to indicate the position of sensor 70 as being proximate to rod *e***.

The sequential light pulses of light rods 61 are obtained by turning on light sources 86, 87, 88 at times $t_1$, $t_2$, $t_3$ by the triggered pulse generators 89, 90, 91, respectively. Pulse generators 89, 90, 91 are of the type suitable for energizing flash type light sources 86, 87, 88 which provide a short duration light pulse as is desired in this embodiment of the invention. Each light source 86, 87, 88 is isolated from the others by being contained within a partitioned enclosure 92 which prevents light from escaping except through apertures 93, 94, 95 respectively, whereupon the light impinges on surfaces 62 of light pipes 61. It is apparent that the grey-coded apertures 93, 94, 95 perform the same function as tabs 51, 52, 53 of FIGURE 2 and transformers 11, 12, 13 of FIGURE 1. Sequential energization of the isolated light sources 86, 87, 88 at times $t_1$, $t_2$, $t_3$ causes each light pipe 61 of array 10 to have a unique sequence of light pulses transmitted therethrough. The absence of light at the times $t_1$, $t_2$, $t_3$ is equivalent to the negative current or voltage of FIGURES 1 and2.

There will be positions of the sensor elements 22, 57 where the radiation from the conductors of the arrays 10 of FIGURES 1 and 2 will be insufficient to produce a signal exceeding a prescribed threshold. This will occur in those situations where the sensor is located at a position intermediate two conductors carrying opposite polarity pulses so that the net field produced is small at the sensor location. In the event this situation exists, the absence of a positive or negative pulse at output terminal 24 at times $t_1$, $t_2$, or $t_3$ will not be a problem if such absence is properly interpreted by the logic circuit 27 of FIGURES 1 and 2. Because FIGURES 1 and 2 use straight binary coding, the circuit 27 must perform the following logic: 1. A positive pulse exceeding the threshold voltage shall produce a positive output pulse, 2. A negative pulse exceeding the threshold voltage shall produce no output pulse; 3. A pulse below threshold shall produce no output pulse but all subsequent pulses to the end of the sequence will produce positive pulses irrespective of their amplitude.

Figure 5:
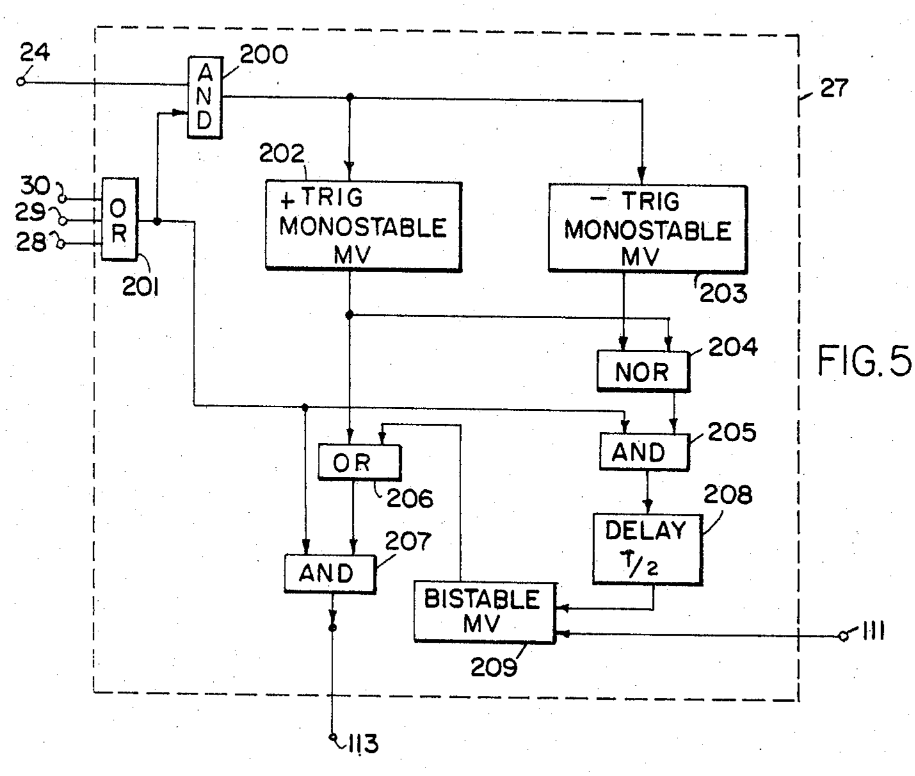
FIGURE 5 is a block diagram of the logic circuit used in FIGURE 1.

A typical logic circuit 27, shown in detail in FIGURE 5, is designed to perform two functions in the circuit of FIGURE 1 where the straight binary code is used. Its first function is to convert the bipolar signal E at output 24 into a unipolar signal; in this case, a positive pulse if the leading half of the bipolar signal is positive, and "no pulse" where the leading half of the bipolar signal is negative. Alternative circuitry, capable of providing a negative pulse instead of "no pulse" is obvious to those skilled in the art. The second function of the logic circuit 27 is to provide for the situation where the signal at time $t_1$, $t_2$ or $t_3$ is smaller than a threshold value, wherein the "below-threshold" pulse produces no output pulse and all succeeding signal pulses are caused to produce output pulses which are of positive polarity. This latter feature is required because of the straight binary code used in FIGURE 1 whereas it is not required when a grey code is used.

For signals whose amplitude exceed the threshold, the operation of logic circuit 27 is as follows. The timing pulses from terminals 28, 29, 30 of FIGURE 1 are combined in OR circuit 201 to provide the gating pulses for GATE circuit 200. Signals from terminal 24 of FIGURE 1 are provided as the other input to GATE 200. The portion of the signal gated is at the discretion of the circuit designer who can interpose delay in the timing pulses by a delay circuit between OR 201 and GATE 200. The timing is adjusted in this example to allow the leading half of the bipolar output pulse of train E of FIGURE 1 to be present at the output of GATE 200. If the output of GATE 200 is a positive pulse exceeding the triggering threshold of monostable multivibrator MV 202, a positive output pulse will be obtained which is transmitter to NOR circuit 204 and OR circuit 206. The output of OR 206 is gated in AND circuit 207 with timing pulses from OR 201 to provide a positive output pulse at terminal 113 of FIGURE 1. The pulse transmitted to NOR 204 causes its output to become low, thus preventing AND circuit 205 from passing triggering pulses from OR 201.

A negative pulse at the output of GATE 200 exceeding the triggering threshold of monostable multivibrator MV 203 also causes NOR 204 output to become low and prevent AND 205 from passing trigger pulses from OR 201. It is noted that no output pulse at terminal 113 is provided by the negative pulse at the output of AND 200. Thus, the binary information at signal input terminal 24 is provided at terminal 113 as a "pulse-no-pulse" waveform.

If the output of GATE 200 is below the threshold of MV 202 and MV 203, neither will provide a pulse to NOR 204 to change its output from the "high" state. A trigger pulse from OR 201 will then be allowed to pass through AND 205, DELAY circuit 208 of delay $\tau/2$, and thence to an input of bistable MV 209 whose output will go "high" to provide a "high" output from OR 206 which in turn will allow AND 207 to provide positive pulses at 113 until such time as MV 209 is caused to provide a "low" output by a reset pulse from terminal 111 of FIGURE 1.

Thus, it is seen that a positive signal at time $t_1$ above threshold at the output of GATE 200 will cause a positive output pulse at terminal 113. If the next pulse at time $t_2$ at the output of GATE 200 is below threshold, there is no output at terminal 113. However, the below threshold pulse will cause bistable MV 209 to be triggered to a "high" output state after a delay of $\tau/2$ seconds in DELAY 208. As a consequence, a positive output pulse at terminal 113 will occur at each trigger pulse (in this example at time $t_3$) from the output of OR 201 after time $t_2$ until such time as OR 306 is caused to turn off AND 207 by resetting MV 209 by a pulse at $t_1-\delta$ from pulse source 17 occurring at terminal 111.

Correspondingly, a negative signal above threshold at the output of GATE 200 will produce no output at terminal 113. If the next pulse is below threshold, no output pulse at terminal 113 is again obtained. However, the triggering of bistable MV 209 will cause all subsequent pulses at terminal 113 to be positive until resetting as above.

Examination of the current pulse waveforms 21 of FIGURE 1 shows that for those situations where the sensor 22 location is such that a below threshold output signal is possible, the logic circuit 27 will function to provide an output pulse train at terminal 113 which is an accurate representation in binary form of the location of the sensor 22 relative to the array of conductors 10.

Figure 7:
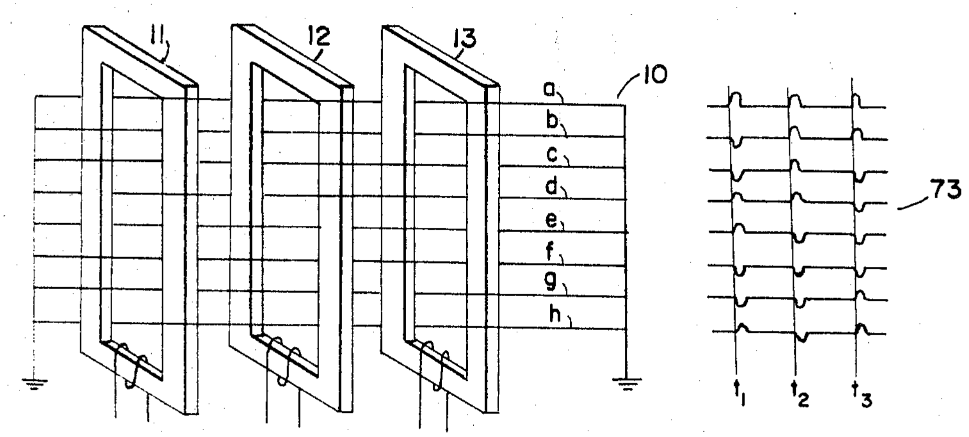
FIGURE 7 is a wiring schematic for obtaining a grey code information pulse sequence.

The optical system of FIGURE 4 has a similar problem of uncertainty as to whether a light pulse has been received when the sensor 70 is between energized and unenergized light pipes 61. In contrast with the coding of FIGURES 1, 2, the aperture patterns 93, 94, 95 of FIGURE 4 have been established to produce a grey-coded sequence or train of light pulses the same as the grey-coded current pulses of FIGURE 7 where a positive pulse of FIGURE 7 represents the presence of light and a negative pulse represents the absence of light. The simple logic circuit 84 of FIGURE 6 will function to provide no output pulse where there is a total absence of light or light below an acceptable threshold at times $t_1$, $t_2$, $t_3$, while providing a positive output pulse when sensor output 72 provides a positive pulse exceeding the threshold of multivibrator MV 210. OR circuit 211 combines the trigger outputs from terminals 81, 82, 83 to provide a single output at times $t_1$, $t_2$, $t_3$. The single output is combined with the output of the signal 72 triggered multivibrator 210 in AND circuit 212 to provide an output pulse at terminal 85 when MV 210 is triggered. The use of the grey coded sequence of light pulses in FIGURE 4 is seen to result in considerable reduction in complexity of the logic circuitry required to handle the below-threshold signal condition.

FIGURE 7 shows the grey coded current pulse sequence 73 in each conductor of array 10 when these conductors have been threaded through the transformers 11, 12, 13 of FIGURE 1 in the manner shown. It is observed that the grey code results in adjacent conductors differing in current direction at only one pulse time $t_1$, $t_2$, or $t_3$. The resultant weak magnetic field with possible below threshold output signal will then occur at most at one pulse position. It is seen that an indeterminancy of the pulse polarity of waveforms 73 at the position of opposed current directions is not a problem since either polarity may be chosen arbitrarily without error. The logic circuit of FIGURE 7, for example, assigns a zero output pulse amplitude to below-threshold signals.

Figure 8:
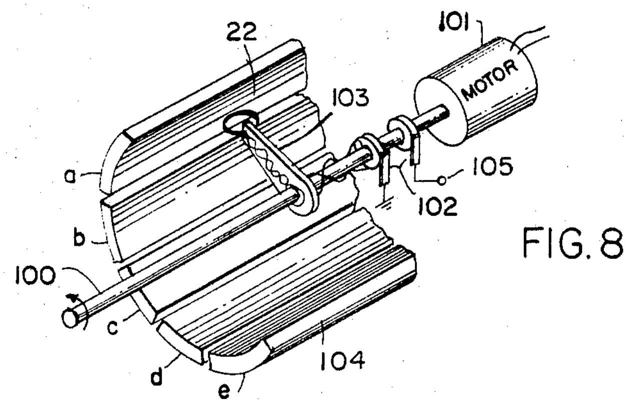
FIGURE 8 is a view of a digital shaft encoder embodiment of the invention.

The one coordinate embodiment of the invention shown in FIGURES 1, 2 and 4 have been illustrated with a flat array 10 of signal conductors which are parallel and uniform in width. Array 10 can be formed as in FIGURE 8 with conductors *a–h* lying at known angular positions on the surface of a cylinder 104 in a direction parallel to the axis of the cylinder to provide a digital shaft encoder. A sensor 22 mechanically secured by arm 103 to a shaft 100 driven by a motor 101 or other driver senses the field produced by the conductors *a–h* when they are energized as in FIGURE 1. The coded pulse train signal detected by sensor coil 22 is transmited through slip rings 102 to output terminal 105. It is seen that only one pair of slip rings for the output signal is required no matter how many conductors may be distributed on the surface of cylinder 104 thus effecting a significant reduction of signal output conductors when compared with conventional multisensor shaft encoder devices.

Figure 9:
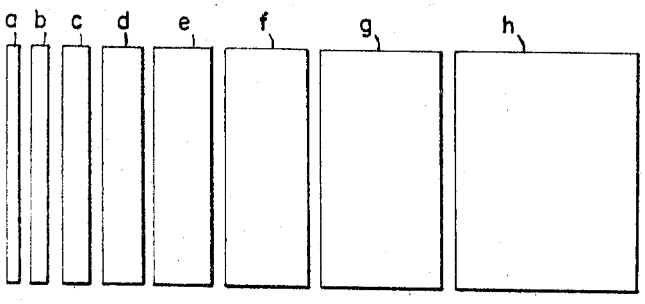
FIGURE 9 illustrates a conductor array where the conductors are of unequal width.

The conductors *a–h* of array 10 have been represented in FIGURES 1 and 2 as being of narrow width compared with the exaggerated spacing between them. The maximum spacing is limited by the fact that the field generated by a conductor diminishes in intensity as distance from the conductor increases. If the field is below threshold the logic circuit 27 will cause each pulse of the output pulse sequence at terminal 24 to be absent or zero regardless of the information pulse sequence on the nearest conductor. Normally, the spacing between the conductors will be as small as conveniently obtainable compatible with the resolution requirement. In addition, the width of conductors *a–h* need not be uniform as shown in FIGURE 9. This arrangement is desirable where a non-uniform resolution capability is required over the entire distance covered by conductors *a–h*. By making the conductors wide in a region requiring only low resolution, a saving is effected in the number of conductors and associated circuitry required to cover a distance. Of course, the width of successive conductors of the array 10 can follow a logarithmic or other functional relationship if desired. It is also apparent that the conductors of array 10 need not be parallel to each other provided that the spacing is kept small by varying conductor width.

Figure 10:
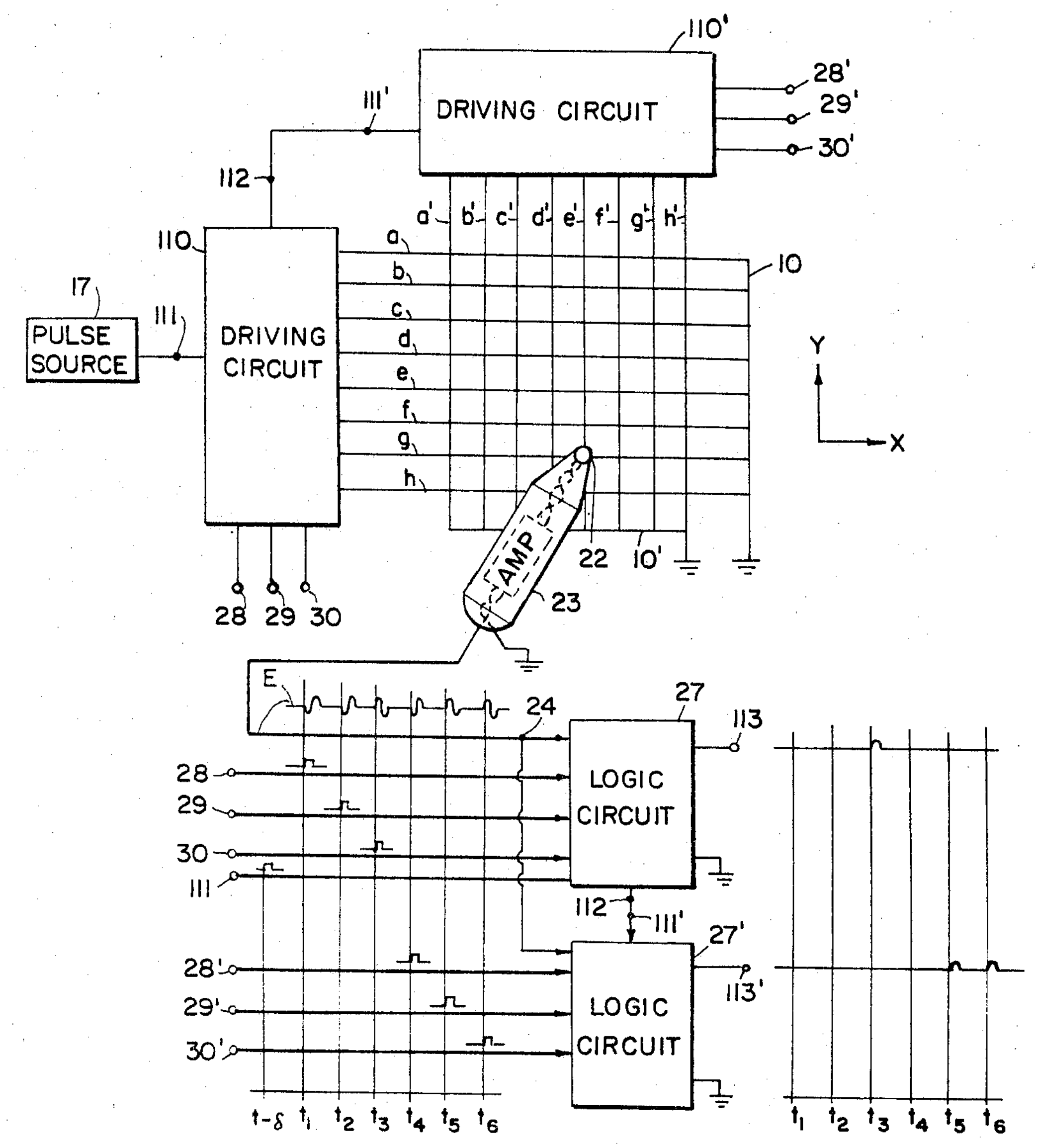
FIGURE 10 is an embodiment of the invention capable of providing two coordinate position information.

The embodiments of the invention of FIGURES 1, 2 and 4 are useful in providing information as to sensor position in only one coordinate. If two coordinate positional information is desired, another array 10′ of FIGURE 10 transverse to the array 10 of FIGURES 1, 2, and 4 must be provided. The coded pulse train generator or driving circuitry 110 for array 10 is shown in FIGURE 1. Array 10′ is driven in the same way by driving circuitry 110′. Circuit 110 has an input-output terminal 111 by which it is energized by pulse source 17, output trigger terminals 28, 29, 30 for providing timing pulses to corresponding terminals of logic circuit 27, and an output trigger terminal 112 for providing a trigger pulse delay $\tau$ seconds by delay unit 114. The delayed trigger pulse appearing at terminal 112 is provided to input terminal 111′ of driving circuit 110′. It is apparent that the conductors *a–h* of array 10 will be energized with a current pulse sequence at times $t_1$, $t_2$, and $t_3$ while array 10′ conductors *a′–h′* are energized at times $t_4$, $t_5$ and $t_6$. The time sequential fields produced by these energized conductors are detected by sensor 22 which is adjacent or proximate to these conductors. The detected signal is available at output terminal 24 for processing by logical circuits 27 and 27′. The operation of logical circuit 27 having previously been explained, it is clear that the pulse train output at terminal 113 is determinative of the Y coordinate position of sensor 22 while output 113′ pulse train gives the X coordinate position. Since sensor 22 is now responsive to orthogonal fields from arrays 10 and 10′, it is necessary to cause its plane to be at an angle of approximately 45° to the conductor directions. Shaping the sensor housing 23 to nestle in the hand of a user so that in normal use the angle is approximately 45° is one way of providing the approximate 45° angle. Another way for getting the correct angle is to have arrays 10 and 10′ tilted at an angle to the horizontal. Sense coil 22 is then rotatably mounted in housing 23 and weighted to assume an angle of 45° to the horizontal which will then be the correct angle with respect to the array conductors.

The required capability for speed of operation of the various embodiments of the invention is determined by the rate of motion of the sensor element 22, 57, 70. For the situation where sensor 22 is used as a writing stylus on the array 10, the maximum expected rate of motion is approximately 10 inches/sec. If the resolution is 0.01 inch, position determinations need be made no more often than 1,000 times/second. For a 20 inch x 20 inch two coordinate position sensing array, the resolution would require 11 bits of digit information for each of the $x$ and $y$ coordinate determinations. The total number of information bits (22) must occur within the 1,000 microseconds allowed for each sensor position determination, leaving more than 40 microseconds for each successive bit determination. It is seen that the apparatus embodying the invention need employ only relatively low speed digital circuits for following quite high sensor velocities which makes for economy, accuracy and ease of fabrication.

Although the invention has been described in embodiments which have used only one sensor 22, 70, it is apparent that more than one sensor can be used concurrently to provide multiple outputs. For the case of two sensors, their individual outputs may be subtracted while still in digital form by conventional techniques to determine their digital separation in one or two coordinates. After digital subtraction, conversion again by conventional techniques to analog form is possible. Again, if sensors are applied to the fingertips, the individual fingertips may have their sensors 22, 70 electrically connected in parallel so that pressure by any one finger at any position of the array 10 will produce a signal corresponding to that position. It is seen that if finger positions are restricted, a typewriter keyboard arrangement is possible with each letter and number position producing a different digital output. Alternately, the sensors need not be paralleled but can provide their isolated individual outputs. This arrangement would be useful where each different finger would be restricted to a columnar position as on an adding machine but could select different rows corresponding to the arithmetic digit of the particular column. The time coincident outputs from the fingertip sensors are then processed digitally to provide addition, multiplication, etc. in conventional computer circuitry.

The invention has been described in terms of a positive or negative pulse of electrical energy or alternately the presence or absence of light. It will be apparent to those skilled in the art that other binary forms are possible. As an example, two frequencies of electrical energy or light energy might be used with a sensor 22, 70 and associated circuitry which is capable of differentiating between the frequencies to provide an effective binary "1" and "0." In the case of light, a red filter for the apertures 93, 94, 95 of FIGURE 4 and a blue filter for those regions of enclosure 92 presently blocking light would provide the necessary excitation. Sensor 70 must be adapted to be responsive to both the red and blue light and provide a positive or negative signal, respectively. This is easily accomplished by causing sensor 70 to have a red filter in front of one photodetector and a blue filter in front of another photodetector. The outputs of the photodetectors are subtracted by conventional analog means, to provide a positive or negative signal indicative of the presence of red or blue light.

It is desirable that positional information as to the location of sensor 22, 70 be provided only when desired. For this reason, a switch in housing 23 responsive to pressure applied to sensor 22, 70 when pressing against the conductor array 10 could be caused to make electrical contact between the sensor and output terminal 24, 72. Thus, signals would appear at output terminal 24, 72 only when there is sufficient sensor-array pressure to cause switch closure. Alternatively, the trigger pulse at terminal 111 could be conductively connected to the above switch to provide a pulse from terminal 24, 72 which would cause external equipment to become responsive to the output pulses at terminal 113. Numerous other techniques for causing equipment to become responsive to intermittent data inputs are known to those skilled in the art.

The sensor 22, 57, 70 can be adapted to provide a marking on paper which may be placed over array 10. The use of pressure sensitive paper allows the use of an unmodified sensor. Ordinary paper requires that the sensor be provided with a source of ink as in a ball point or capillary tube, or with a lead point. The exercise of only ordinary mechanical skill is required to adapt sensors 22, 57, 70 for simultaneous detection and marking functions.

The pulse generators 14, 15 16 of FIGURES 1 and 2 and generaors 89, 90, 91 of FIGURE 4 has been shown as individual generators. As is well known to those skilled in the art, these generators may be replaced by one generator whose output is sequentially switched to transformers 11, 12, 13, transformers 54, 55, 56 and light sources 86, 87, 88 through gating circuits (not shown) controlled by trigger pulses from delay units 18, 19, 20.

As mentioned earlier, the conductors of an array need not be parallel. In addition, they need not be straight lines. A two coordinate embodiment of the invention which illustrates both of these situations is a polar coordinate analog to digital conversion apparatus as contrasted to the orthogonal $x$–$y$ coordinate device of FIGURE 10. In the polar coordinate apparatus one set of conductors and drivers, corresponding to the $x$ coordinate drive of FIGURE 10, would be arranged so that the conductors form the radial lines of the polar conversion apparatus. These radial conductors would terminate at the origin of the polar coordinate array and be driven at the outer circumference of the array. These radial conductors will provide angular position data to a sensor. The other set of conductors in the polar coordinate apparatus would form concentric circles centered about the polar origin. These conductors would correspond to $y$ the array of FIGURE 10. Energization of these concentric conductors can be accomplished by one skilled in the art following the methods illustrated in FIGURES 1, 2 and 4. The concentric conductors will provide the radial distance of a sensor from the origin. Thus, a sensor located anywhere on the surface of the polar conversion apparatus can be located in its angular and radial position by the unique serially coded fields which it detects.

While the invention has been described with reference to a preferred embodiment and alternatives thereof, it will be appreciated that various modifications thereof may be accomplished by one skilled in the art without departing from the spirit or scope of the invention.

Having thus described the invention, I claim:

1. Apparatus for providing an analog to digital converter comprising:
   - a plurality of conductors spaced from each other and substantially transverse to a coordinate direction,
   - each conductor having a known position in said coordinate direction,
   - means for electromagnetically coupling to each conductor a known different serial binary pulse train of energy,
   - each conductor radiating said energy,
   - means for detecting said radiated energy to provide an output signal,
   - said output signal pulse train corresponding to the pulse train of the conductor to which it is adjacent,
   - whereby the location of said detector along said coordinate direction is determined.

2. A sensor position determining device comprising:
   - a plurality of N electromagnetic energy pulse sources,
   - a plurality of no more than $2^N$ conductors,
   - means for sequentialy energizing each source to provide a sequence of pulses of electromagnetic energy,
   - means for coupling the energy of each source to each of said $2^N$ conductors,
   - said coupling means being adapted to provide a known different N pulse sequence of energy in each conductor,
   - a sensor coupled and responsive to energy in the conductor closest thereto to provide an output signal,
   - said output signal being an N pulse sequence corresponding to the N pulse energy sequence in said closest conductor, whereby said sensor position is determined relative to said closest conductor.

3. Apparatus for determining the position of a detector comprising:

a plurality of electromagnetic energy conductors,
a plurality of sources of electromagnetic energy,
means for causing each energy source to emit energy at a different time,
said plurality of conductors being selectively electromagnetically coupled by said emitted energy to said energy sources.
said selective coupling being such that the time sequence of electromagnetic energy coupled into any one of said conductors is known and different from the time sequence in any other conductor,
a detector electromagnetically coupled to said conductors.
said detector providing an output signal corresponding to the time sequence of the electromagnetic energy in the one conductor to which it is most closely coupled,
whereby the location of said detector is determined to be proximate said one conductor.

4. An apparatus for determining sensor position comprising:

a plurality of electrical conductors,
means for coupling electrical energy into said conductors,
said coupling means providing each conductor with a known different time sequence of pulses of electrical energy,
each conductor providing a sequential external field in accordance with its sequential pulses of electrical energy,
a sensor responsive to said external field to provide a pulsed signal output whose time sequence is the same as that of a conductor whose field is being sensed,
whereby the sensor position is determined to be in the vicinity of said sensed field conductor.

5. Apparatus for determining a sensor position comprising:

a plurality of conductors of electrical energy each having a known analog position,
a plurality of sources of electrical energy,
means for causing each source to provide energy in time sequence,
means for coupling said sources to said conductors without a direct electrical connection between said sources and said conductors,
said coupling means causing each source to provide a portion of said conductors with electrical energy of one polarity and the remainder with energy of the opposite polarity,
said coupling means being arranged to provide each conductor with a different serial time sequence of polarities of energy,
a sensor for determining without a direct electrical connection between the sensor and said conductors the serial sequence of polarities of energy in a conductor to which it is proximate,
whereby the analog position of said sensor is determined.

6. Apparatus for determining detector position comprising:

a plurality of at most $2^N$ electrical current conductors,
a plurality of N current pulse sources,
means for time sequentially causing each source to emit a pulse current,
means for magnetically coupling each source to each conductor,
said coupling being such that the induced current serial N pulse train in each conductor is different from that in any other conductor,
whereby each conductor provides a unique pulsed magnetic field surrounding it corresponding to its current pulse train,
a detector responsive to magnetic field in proximity to one of said conductors to provide an output signal,
said output signal being a pulse train corresponding to the current pulse train in said one conductor,
whereby the position of said detector is determined to be proximate to said one conductor.

7. Apparatus for determining the analog position of a detector comprising:

a plurality of no more than $2^N$ electrical current conductors,
each conductor having a known analog position,
a plurality of N transformers each having a core and primary winding,
a plurality of N current pulse sources each connected to the primary winding of one of said plurality of transformers,
each of said plurality of conductors threading the core of each transformer,
the threading-direction sequence for any conductor through these cores being different from the threading-direction sequence of any other conductor,
a source of time sequential trigger pulses,
each current pulse source being connected to a different trigger pulse to provide a current pulse in each transformer primary winding in time sequence,
whereby each conductor has induced therein a known binary sequential N pulse train of excitation current pulses different from the pulse train in any other conductor,
said pulse train producing a corresponding magnetic field surrounding said conductor,
a magnetic field detector responsive to the field in the vicinity of a conductor to produce a signal corresponding to the excitation current pulse sequence,
whereby said signal is determinative of the analog position of said detector.

8. An apparatus for determining the position of a detector comprising:

a plurality of extended light emitting surfaces,
means for inducing in each emitting surface a time sequence of pulses of light energy,
the time sequence of pulses being different in each surface,
a light sensitive detector responsive to the energy emitted from said surfaces,
the output signal of said detector being a pulsed time sequence responsive to the induced time sequence of light energy in one surface to which it is proximate,
whereby the detector is determined to be near said one surface.

9. An appaartus for determining the position of a detector comprising:

a plurality of radiant energy emitting conductors,
a plurality of radiant energy sources,
means for causing each source to emit a pulse of radiant energy in time sequence,
means for selectively coupling each source to each conductor,
whereby each conductors is caused to contain a time sequence of pulses of radiant energy different from any other conductor,
a detector for sensing the energy emitted from said conductors to provide an output signal,
said output signal having the same time sequence as the energy pulses in the emitting conductor to which it is responsive,
whereby the position of said detector is determined to be nearest said emitting conductor.

10. Apparatus for providing a digital signal indicative of the analog position of a detector comprising:

a plurality of light energy conducting and emitting rods each having a defined analog position,
a plurality of light energy sources, means for causing each light source to flash in time sequence, a light mask interposed between said light sources and said rods, said mask having apertures which allow transmission of light from each one of said sources to selected rods, said apertures forming a spacial aperture pattern along the length of each rod different from the pattern along any other rod, whereby flashing of each of said light sources in time sequence causes each rod to have a time sequence of light pulses conducted therethrough and emitted therefrom, each rod having a known time sequence different from that in any other rod, a light sensitive detector in proximity to one of said rods and responsive to the light emitted therefrom to provide a serially pulsed output signal corresponding to light pulses in said rod, whereby the detected pulse sequence determines the particular one rod and hence the analog position of the detector.

11. Apparatus for providing a unique serial binary pulse code in each of a plurality of conductors comprising:

a plurality of N energy sources, means for causing each energy source to provide energy in predetermined fixed time sequence, a plurality of more than N conductors, means for selectively coupling each of said energy sources to each of said conductors to energize each conductor with a different predetermined fixed serial N bit binary code.

12. Apparatus for providing a unique serial binary pulse code in each of a plurality of conductors comprising:

a plurality of conductors of electromagnetic energy, a plurality of sources of electromagnetic energy, means for sequentially coupling electromagnetic energy from each source to said plurality of conductors to provide a predetermined fixed different binary sequence of energy in each conductor.

13. Apparatus for providing a unique serial binary pulse code in each of a plurality of conductors comprising:

a plurality of N electromagnetic energy pulse sources, a plurality of no more than $2^N$ conductors, means for sequentially energizing each source to provide a predetermined fixed sequence of pulses of electromagnetic energy, means for coupling the energy of each source to each of said $2^N$ conductors, said coupling means being adapted to provide a known different N pulse sequence of energy in each conductor.

14. Apparatus for providing a unique serial binary pulse code in each of a plurality of conductors comprising:

a plurality of at most $2^N$ electrical current conductors, a plurality of N current pulse sources, means for time sequentially causing each source to emit a pulse of current in a repetitive predetermined fixed sequence, means for magnetically coupling each source to each conductor, said coupling being such that the repetitive induced current serial N pulse train in each conductor is different from that in any other conductor, whereby each conductor provides a unique pulsed magnetic field surrounding it corresponding to its current pulse train.

15. Apparatus for providing a unique serial binary pulse code in each of a plurality of conductors comprising:

a plurality of no more than $2^N$ electrical current conductors, a plurality of N transformers each having a core and primary winding, a plurality of N current pulse sources each connected to the primary winding of one of said plurality of transformers, each of said plurality of conductors threading the core of each trasnformer, the threading-direction sequence for any conductor through these cores being different from the threading-direction sequence of any other conductor, a source of time sequential trigger pulses, each current pulse source being connected to a different trigger pulse to provide a current pulse in each transformer primary winding in a predetermined fixed time sequence, whereby each conductor has induced therein a known binary sequential N pulse train of excitation current pulses different from the pulse train in any other conductor, said pulse train producing a corresponding magnetic field surrounding said conductor.

16. Apparatus for providing a unique serial binary pulse code in each of a plurality of conductors comprising:

a plurality of light energy conducting and emitting rods each having a defined analog position, a plurality of light energy sources, means for causing each light source to flash in time sequence, a light mask interposed between said light sources and said rods, said mask having apertures which allow transmission of light from each one of said sources to selected rods, said apertures forming a spacial aperture pattern along the length of each rod different from the pattern along any other rod, whereby flashing of each of said light sources in time sequence causes each rod to have a time sequence of light pulses conducted therethrough and emitted therefrom, each rod having a known time sequence different from that in any other rod.

References Cited

UNITED STATES PATENTS 3,142,055 7/1964 Gasper ------------ 340—347

OTHER REFERENCES

Light Coupled Threshold Logic by W. P. Dunke, IBM Technical Disclosure Bulletin, vol. 6, No. 4, September 1963, p. 142.

MAYNARD R. WILBUR, *Primary Examiner.*

W. J. KOPACZ, *Assistant Examiner.*

U.S. Cl. X.R.

340—166